United States Patent [19]

Hörnig et al.

[11] 4,077,233
[45] Mar. 7, 1978

[54] INSTALLATION FOR VIBRATION DAMPING IN DRIVE CONNECTIONS OF MOTOR VEHICLES

[75] Inventors: Rudolf Hörnig, Esslingen; Bruno Beeskow, Bietigheim; Günter Wörner, Rommelshausen, all of Germany

[73] Assignee: Daimler-Benz Aktiengesellschaft, Germany

[21] Appl. No.: 659,707

[22] Filed: Feb. 20, 1976

[30] Foreign Application Priority Data

Feb. 26, 1975 Germany ............................ 2508212

[51] Int. Cl. ................................................ F16f 15/12
[52] U.S. Cl. ................................. 64/11 R; 64/27 NM; 74/574
[58] Field of Search .................. 64/1 V, 27 NM, 27 R, 64/11 R; 74/574, 573; 188/1 B

[56] References Cited

U.S. PATENT DOCUMENTS

| 1,941,061 | 12/1933 | Thiry | 74/574 |
| 2,948,129 | 8/1950 | Troyer | 64/27 NM |
| 2,956,187 | 10/1960 | Wood | 64/11 R |
| 3,242,766 | 3/1966 | Arnt | 64/27 NM |

FOREIGN PATENT DOCUMENTS 718,411  11/1931  France ........................ 74/574

Primary Examiner—Samuel Scott
Assistant Examiner—R. C. Turner
Attorney, Agent, or Firm—Craig & Antonelli

[57] ABSTRACT

An installation for damping vibrations in the drive connection of vehicles, especially of motor vehicles, with the aid of a vibration damper whose vibrating mass is constructed as annular body and is connected with a driving part of the drive connection by means of an elastic body; the damper thereby serves for damping the torsional vibrations of the drive connection and also the bending vibrations of the drive shaft while the elastic body is delimited, on the one hand, by a cylinder surface and, on the other, by a polygonal surface.

23 Claims, 3 Drawing Figures

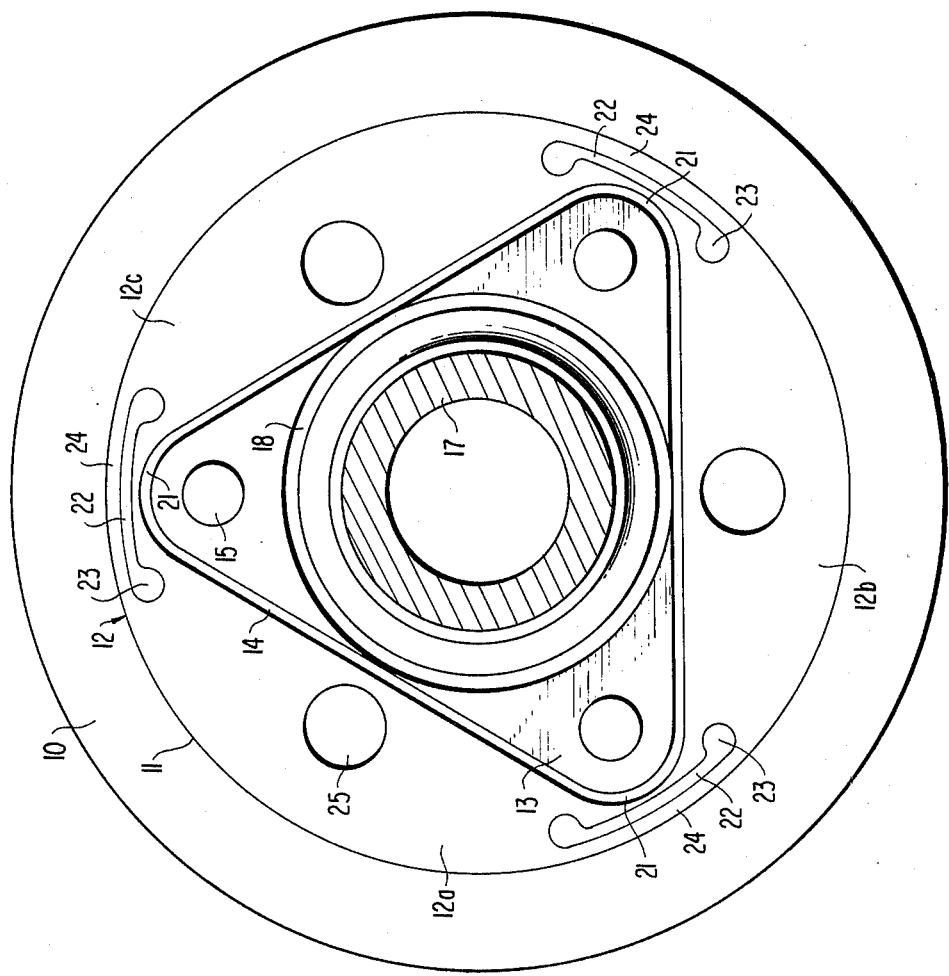
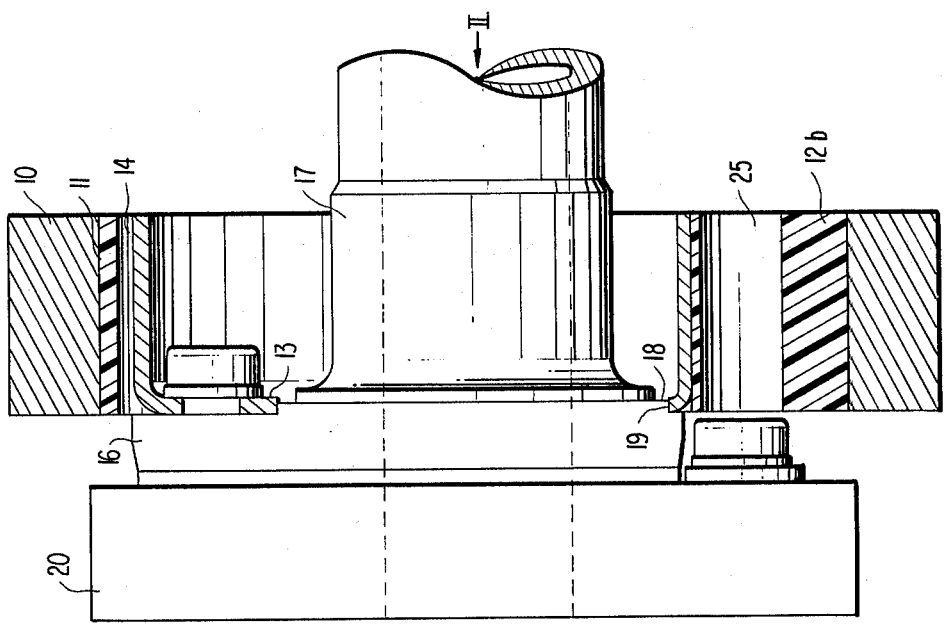

INSTALLATION FOR VIBRATION DAMPING IN DRIVE CONNECTIONS OF MOTOR VEHICLES

The present invention relates to an installation for the vibration damping in the drive connection of vehicles, especially of passenger motor vehicles, with the aid of a vibration damper or vibration amortizer whose vibrating mass is constructed as annular body and is connected by means of an elastic body of rubber or technically analogous material with a driving part of the drive connection.

Known installations of the aforementioned type are constructed approximately in the manner of known sleeve springs, i.e., a circular annularly shaped rubber body is arranged between the cylinder surfaces of an outer and of an inner rigid part or between axially normal surfaces of two rigid disk parts, whereby one of the rigid parts forms the damper or amoritzer mass. With such types of installations, the elastic body is stressed always in shear. They serve for damping rotational vibrations of a drive connection. The bending vibrations which also occur cannot be influenced by the same. In contrast thereto, these bending vibrations cause an eccentric rotation on the part of the damper under certain circumstances.

However, bending vibrations or oscillations always occur in the aforementioned drive connection of motor vehicles. The present invention now aims at correspondingly damping also these bending vibrations, which heretofore took place by a corresponding support of the generating or producing aggregates or by intermediate supports of the drive shaft or universal joint.

With such dampers the damping mass cannot fall below a predetermined amount because otherwise the damper does not respond at all. Furthermore, in practice, the magnitude of the damper mass is also limited in the upward direction. Within these limits the variation possibility lies essentially only in the rubber hardness. However, also in connection therewith it is to be noted that the rubber hardness is limited in the downward direction, because otherwise the rubber is no longer able to return the damper mass possibly running eccentrically into its starting position against the centrifugal force.

The present invention now has as its subject the general concept to match a damper to the different frequencies of different types of vibrations, and proposes in particular that the damper serves for the damping of torsional vibrations of the drive connection and also of the bending vibrations of the universal joint shaft, and in that the elastic body is limited, on the one hand, by a cylinder surface and, on the other, by a polygonal surface. The proposed configuration produces different types of stresses in the elastic body.

The deviation from the purely circular shape, described hereinabove is not unknown as such. Thus, for example, the German Pat. No. 710,556 discloses a vibration damper with radial arms or radial surfaces in the rubber body. However, this prior art structure involves a pure rotational-vibration-damper in which the rubber body is stressed in compression or with adhering construction in compression/tension. The German Offenlegungsschrift No. 1,625,732 also discloses the deviation from the circular shape and also combined stresses in the rubber body. However, this patent involves an elastic coupling, i.e., the torque is transmitted by way of the elastic body which is in sharp contrast to the damper. The same is true analogously for the elastic couplings according to the French Pat. No. 670,010 and to the German Offenlegungsschrift No. 1,575,964 in which additionally the deviation from the circular form lies on both sides.

The present invention prefers a solution according to which the elastic body is arranged in the form of three circular-segment-shaped sections between the cylindrical inner circumference of the damper mass and an axially parallel bent-off edge of a triangularly shaped support flange. It is thereby then further proposed that slot-shaped apertures are arranged in the elastic body between the peaks of the support body and the damper mass, which extend in the circumferential direction.

One is able to influence the frequency location and condition of the damper by the length of the slots. Another feature of the present invention provides that the ends of the slots terminate in larger rounded-off openings whereas in its middle area, elastic material is still present at least at one of the rigid parts for the formation of an abutment at the other part. The distance may thereby be as small as possible. Preferably, also in the slot narrow rubber layers are still present on both metal parts.

It is additionally proposed by the present invention that the fastening bores of the support flange are provided in the triangle apices inside of the edge. A further influencing of the frequency location and condition can be achieved if according to a further inventive feature, axially parallel bores are provided in the segment-shaped sections of the elastic body. However, these bores may also serve additionally for the passage of tools, by means of which the fastening means for the universal joint shaft or for other parts can be serviced. For that case it appears appropriate if according to the present invention the bores in the support flange and those in the elastic body are disposed along the same diameter.

It is generally known to arrange a bending vibration damper in or at least in proximity of a vibration antinode. It has been found as particularly advantageous for the case of the present invention if the damper is arranged at the end of the universal joint shaft facing the transmission in such a manner that the support flange is secured at the universal joint or drive shaft flange and the universal joint or drive shaft flange extends inwardly through the damper.

For purposes of completeness, it should also be mentioned that the elastic body can be installed by prestress, adhesion or gluing or in any similar manner between the two rigid parts. The polygon shape is appropriately rounded off at the corners. The polygon sides themselves need not be constructed precisely straight or rectilinearly, rather a deviating form is still within the scope of the present invention insofar as only a sufficient difference remains assured with respect to the inner circular surface of the damper mass.

Accordingly, it is an object of the present invention to provide an installation for damping vibrations in the drive connection of motor vehicles which avoids by simple means the aforementioned shortcomings and drawbacks encountered in the prior art constructions.

Another object of the present invention resides in an installation for damping vibrations in the drive connection of motor vehicles which is able to dampen not only rotational vibrations but also bending vibrations and oscillations.

A further object of the present invention resides in a vibration damping device in which the damper can be readily matched to the different frequencies of different types of vibrations.

Still another object of the present invention resides in an installation for damping vibrations in the drive connection of motor vehicles in which different types of stresses can be dampened effectively.

These and other objects, features and advantages of the present invention will become more apparent from the following description when taken in connection with the accompanying drawing which shows, for purposes of illustration only, two embodiments in accordance with the present invention, and wherein:

FIG. 1 is an axial cross-sectional view through a vibration damper in accordance with the present invention;

FIG. 2 is an end elevational view on the damper according to FIG. 1, taken in the direction of arrow II of FIG. 1.

Figure 3:
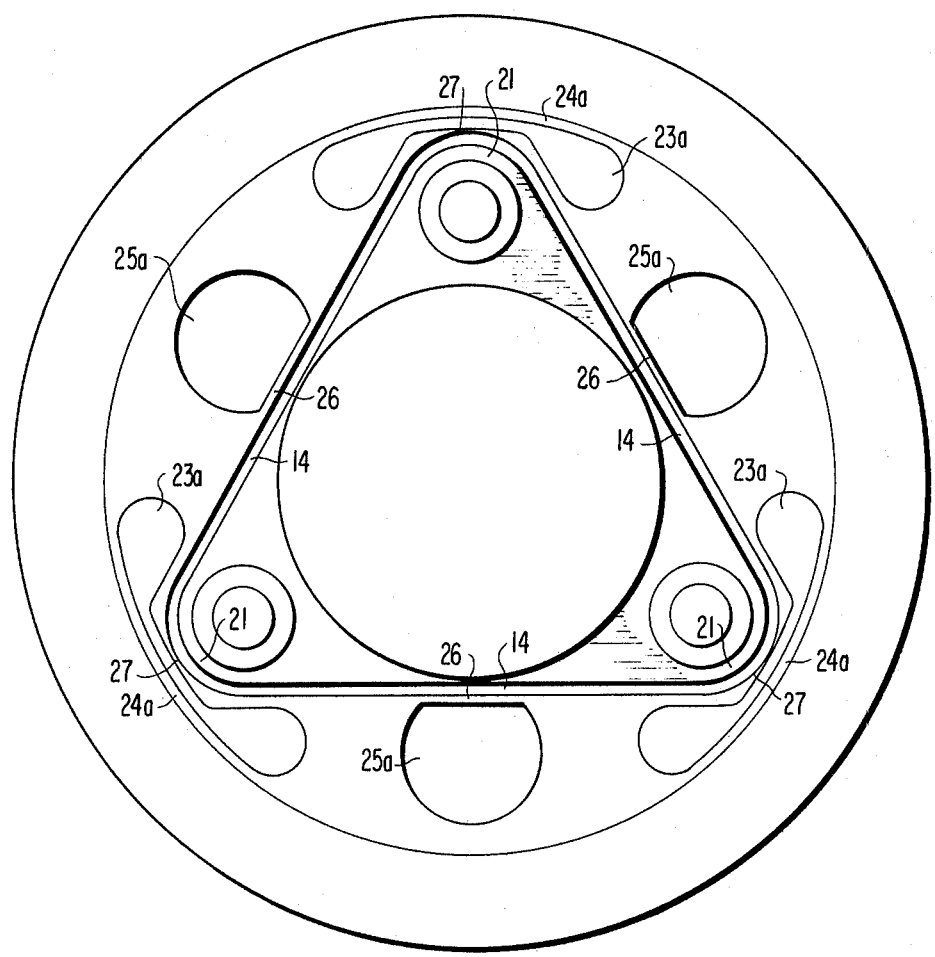
FIG. 3 is an end elevational view, similar to FIG. 2, of another embodiment of a damper in accordance with the present invention.

Referring now to the drawing wherein like reference numerals are used throughout the various views to designate like parts, according to FIGS. 1 and 2, the damper mass 10 is constructed as circular ring-shaped body. An elastic body 12 (FIG. 2) which is adhesively secured is arranged at the inner circumference 11 of the damper mass 10. The support flange 13 (FIGS. 1 and 2) of the damper is formed by a triangular shaped disk whose outer edge 14 is bent off in the axially parallel direction. Bores 15 are provided within the corners of the support flange 13 on the inside of this edge 14, with the aid of which the damper is secured at the flange 16 of the drive shaft or universal joint shaft 17, whereby the large opening 18 of the support flange 13 serves for the centering on an offset or shoulder 19 of the universal joint shaft flange 16. This universal joint shaft flange 16 is secured with the aid of the same fastening means at the elastic disk 20 which, on the other hand, is operatively connected with the transmission output shaft.

As a result of the triangular shape of the support flange 13, the elastic body 12 essentially consists of three segment-like rubber parts 12a, 12b and 12c. Slots 22 are provided in the elastic body 12 at the triangle apices 21 of the support flange 13—which are naturally rounded off—whose ends terminate in somewhat larger openings 23. The remaining rubber layer 24 serves as abutment in case of radial deflection. Additionally, bores 25 are also arranged in the segments 12a, 12b and 12c which are appropriately located along the same diameter as the bores 15 in the support flange 13. These bores 25 serve in the first instance for influencing the frequency location and condition of the damper and additionally for extending therethrough tools in order to be able to tighten the fastening bolts between the elastic disk 20 and the transmission output shaft flange.

In the direction of rotation the segments 12a, 12b and 12c are stressed essentially in pure shear in their strong central parts, i.e., where the bores 25 are arranged. In contrast thereto, in the corners, i.e., within the area of the slots 22 and the ends 23 thereof, a more or less large shear/compression or shear/tension occurs. The individual segments are stressed per rotation in tension, compression and shear in the radial direction conditioned by the rotation and the deflection. The length of the slots 22 as well as the shape have a large influence on the frequency location and condition of the damper. An excessive radial deflection is absorbed by the abutment at the elastic layers 24.

FIG. 3 illustrates a damper which in principle is of the same construction. However, in this embodiment the bores 25a are constructed so large that they have to be flattened off chordal-like with respect to the edge 14. However, a thin rubber layer 26 thereby always remains at the edge 14 in order to prevent tears in the rubber body. The openings 23a thereby have a larger diameter which has as a consequence the reduction of the natural frequency. A weak rubber layer 27 thereby faces also or is disposed opposite the weak rubber layer 24a at the triangle apices 21.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An installation for damping vibrations in the drive connection of vehicles, which comprises a vibration damper means having a vibrating mass constructed as annular member and operatively connected with a driving part of the drive connection by way of an elastic body means, characterized in that the damper means serves for damping torsional vibrations of the drive connection as also bending vibrations of the driving part, and in that the elastic body means is delimited on the one hand by a cylinder surface and on the other by a polygonal surface; characterized in that the elastic body means is arranged in the form of three segment-shaped sections between the cylindrical inner surface of the damper mass and the axially essentially parallelly bent-off edge of a triangularly shaped support flange means; and further characterized in that slot-shaped apertures are provided in the elastic body means between the apices of the support flange means and the damper mass, which extend essentially in the circumferential direction.

2. An installation according to claim 1, characterized in that the ends of the slots terminate in larger rounded-off openings whereas elastic material is still present within the center area at least at one of the rigid parts for the formation of an abutment at the other part.

3. An installation according to claim 2, characterized in that fastening bores for the support flange means are provided inside of the edge of the triangle apices.

4. An installation according to claim 3, characterized in that axially parallel bores for influencing the frequency are provided in the segment-shaped sections of the elastic body means.

5. An installation according to claim 4, characterized in that the bores in the support flange means and the bores in the elastic body means are disposed substantially along the same diameter.

6. An installation according to claim 5, characterized in that the damper means is so arranged at the end of the universal joint shaft facing the transmission that the support flange means is secured at a universal joint shaft flange and the universal joint shaft extends through the damper means.

7. An installation for damping vibrations in the drive connection of vehicles, which comprises a vibration damper means having a vibrating mass constructed as annular member and operatively connected with a driving part of the drive connection by way of an elastic body means, characterized in that the damper means serves for damping torsional vibrations of the drive connection as also bending vibrations of the driving part, and in that the elastic body means is delimited on the one hand by a cylinder surface and on the other by a polygonal surface; characterized in that the elastic body means is arranged in the form of three segment-shaped sections between the cylindrical inner surface of the damper mass and the axially essentially parallelly bent-off edge of a triangularly shaped support flange means; characterized in that fastening bores for the support flange means are provided inside of the edge in the triangle apices; and further characterized in that axially parallel bores for influencing the frequency are provided in the segment-shaped sections of the elastic body means.

8. An installation according to claim 7, characterized in that the bores in the support flange means and the bores in the elastic body means are disposed substantially along the same diameter.

9. An installation for damping vibrations in the drive connection of vehicles, which comprises a vibration damper means having a vibrating mass constructed as annular member and operatively connected with a driving part of the drive connection by way of an elastic body means, characterized in that the damper means serves for damping torsional vibrations of the drive connection as also bending vibrations of the driving part, and in that the elastic body means is delimited on the one hand by a cylinder surface and on the other by a polygonal surface; characterized in that the elastic body means is arranged in the form of three segment-shaped sections between the cylindrical inner surface of the damper mass and the axially essentially parallelly bent-off edge of a triangularly shaped support flange means; and further characterized in that the damper means is so arranged at the end of the driving part facing the transmission that the support flange means is secured at the driving part and the driving part extends through the damper means.

10. An installation for damping vibrations in drive connections of vehicles comprising vibration damping means for damping both torsional vibrations of a vehicle drive connection and bending vibrations of a driving means of the drive connection, said vibration damping means including an annular mass member and an elastic body means for operatively connecting said mass member with the driving means, wherein said elastic body means includes an elastic member having a cylindrical surface arranged at said mass member and a substantially polygonal surface arranged at the driving means, and wherein apertures are provided in said elastic member between the apices of said polygonal surface and said cylindrical surface.

11. An installation according to claim 10, wherein said apertures are slot-shaped and extend in the circumferential direction.

12. An installation according to claim 11, wherein the slot-shaped apertures have rounded openings at the ends of the slots with a greater dimension than the slots.

13. An installation according to claim 12, wherein axially parallel bores are provided in said elastic member diametrically opposite to said apices.

14. An installation according to claim 13, wherein said polygonal surface includes three surface sections of a triangle.

15. An installation according to claim 14, wherein the driving means includes a support flange means having fastening bores adjacent said apices.

16. An installation according to claim 10, wherein axially parallel bores are provided in said elastic member diametrically opposite to said apices.

17. An installation according to claim 10, wherein said polygonal surface include three surface sections of a triangle.

18. An installation according to claim 10, wherein the driving means includes a support flange means having fastening bores adjacent said apices.

19. An installation according to claim 10, wherein said driving means includes a universal joint shaft.

20. An installation according to claim 10, wherein said elastic member is constituted of rubber.

21. An installation for damping vibrations in drive connections of vehicles comprising vibration damping means for damping both torsional vibrations of a vehicle drive connection and bending vibrations of a driving means of the drive connection, said vibration damping means including an annular mass member and an elastic body means for operatively connecting said mass member with the driving means, wherein said elastic body means includes an elastic member having a cylindrical surface arranged at said mass member and a substantially polygonal surface arranged at the driving means, and wherein axially parallel bores are provided in said elastic member diametrically opposite to apices of said polygonal surface.

22. An installation according to claim 21, wherein said polygonal surface include three surface sections of a triangle.

23. An installation for damping vibrations in drive connections of vehicles comprising vibration damping means for damping both torsional vibrations of a vehicle drive connection and bending vibrations of a driving means of the drive connection, said vibration damping means including an annular mass member and an elastic body means for operatively connecting said mass member with the driving means, wherein said elastic body means includes an elastic member having a cylindrical surface arranged at said mass member and a substantially polygonal surface arranged at the driving means, and wherein apertures are provided in said elastic member between the apices of said polygonal surface, and wherein said damping means is arranged at one end of said driving means facing the transmission, and said driving means includes a part extending through said damping means.

* * * * *